United States Patent [19]

Carlson et al.

[11] 4,332,572
[45] Jun. 1, 1982

[54] REMOTELY MANUALLY CONTROLLABLE BELT DRIVE CLUTCH

[76] Inventors: Paul R. Carlson; Richard L. Carlson, both of P.O. Box 290, San Bernardino, Calif. 92402

[21] Appl. No.: 160,968

[22] Filed: Jun. 19, 1980

Related U.S. Application Data

[63] Continuation-in-part of Ser. No. 935,599, Aug. 21, 1978, abandoned.

[51] Int. Cl.$^3$ ............................................. F16H 55/52
[52] U.S. Cl. ......................................... 474/38; 474/46; 192/93 A
[58] Field of Search ................... 474/37, 38, 43, 46; 192/10, 11, 93 A

[56] References Cited

U.S. PATENT DOCUMENTS

| 1,235,794 | 8/1917 | Hardaker . | |
|---|---|---|---|
| 2,341,786 | 2/1944 | Johnson et al. . | |
| 2,941,412 | 6/1960 | Wrobbel | 474/37 |
| 3,582,067 | 1/1952 | Reeves . | |
| 3,665,781 | 5/1972 | Kawamura . | |
| 3,811,331 | 5/1974 | Moogk | 474/46 |
| 4,223,771 | 9/1980 | Petersen | 474/37 |

FOREIGN PATENT DOCUMENTS

| 1102759 | 6/1954 | France | 474/38 |
|---|---|---|---|
| 114244 | 3/1918 | United Kingdom . | |

*Primary Examiner*—Kenneth Dorner
*Attorney, Agent, or Firm*—Dana E. Keech

[57] ABSTRACT

A belt drive clutch having a hexagonal sleeve splined on a power output shaft and carrying an outer sheave disc. A drive belt supporting annulus is freely rotatable on the sleeve and located between the outer sheave disc and an inner sheave disc. The inner sheave disc has a stud shaft extending inwardly and having a hexagonal bore matching the hexagonal external conformation on the sleeve. Ball bearings are assembled on the stud shaft and a clutch control ring is assembled on a peripheral race of the ball bearing. A camming arrangement shifts the clutch control ring axially to engage or disengage the belt by optionally constricting or expanding the space between the outer and inner sheave discs.

6 Claims, 4 Drawing Figures

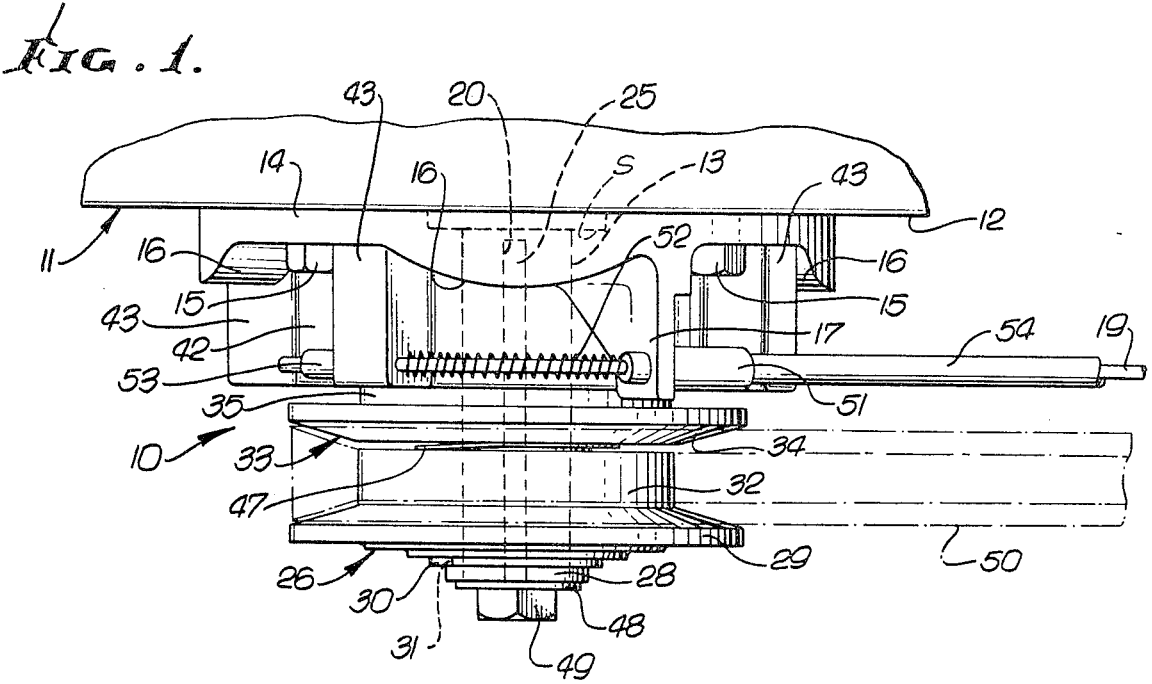
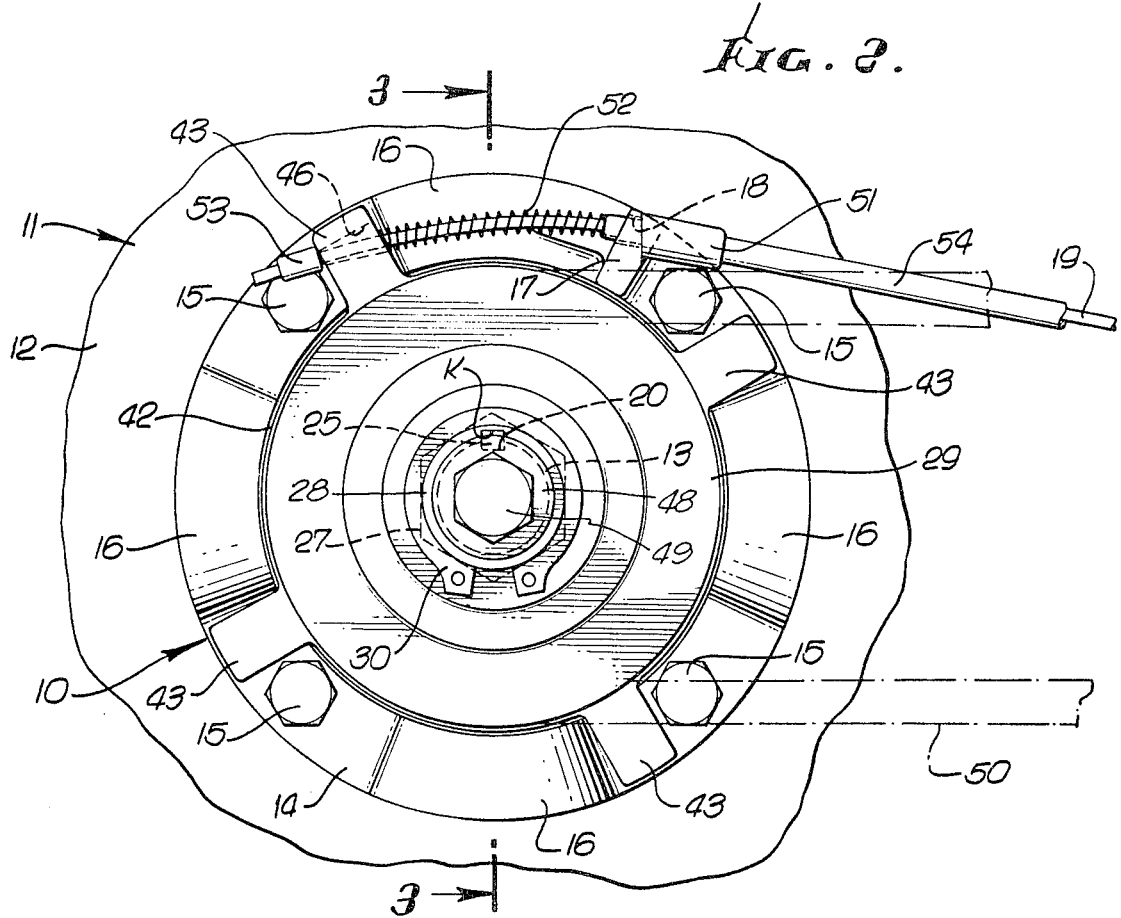

REMOTELY MANUALLY CONTROLLABLE BELT DRIVE CLUTCH

This application is a continuation-in-part to be substituted for its parent application Ser. No. 935,599 filed Aug. 21, 1978 on Belt Drive Clutch which parent application is hereby abandoned.

SUMMARY OF THE INVENTION

Included among the objects of the invention are the following:

1. To render obsolete the clutch heretofore commonly used in industry wherein a low power engine was permitted to idle while the output pulley on the drive shaft was directly engaging the drive belt frictionally and was merely slackened by relaxing an idle pulley used to control the clutch.

2. Providing a simple, efficient and economical belt drive clutch in which the belt is subjected to a relatively small amount of wear at any time and which idles with practically no wear on the belt.

3. Providing such a clutch which may be customer mounted on a standard, widely available, small engine without requiring special tools or instructions.

BRIEF DESCRIPTION OF THE DRAWINGS

FIG. 1 is a plan view of a preferred embodiment of the invention showing the clutch disengaged, the clutch driven endless belt being shown in broken lines.

FIG. 2 is a front elevation of FIG. 1.

SPECIFIC DESCRIPTION OF THE INVENTION

Figure 3:
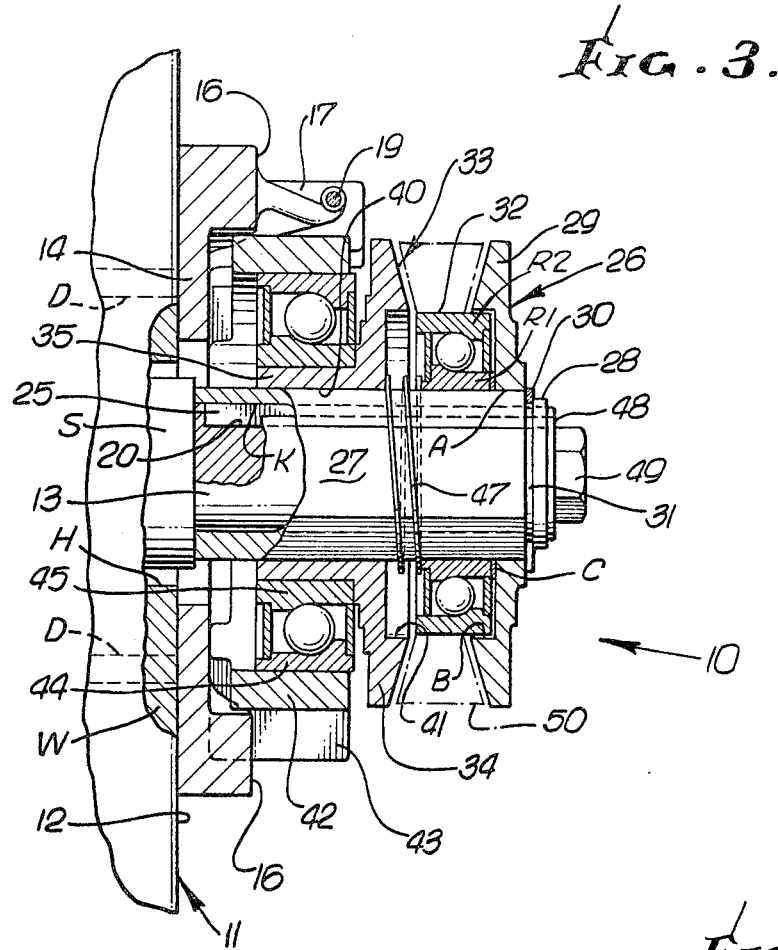
FIG. 3 is a vertical sectional view taken on line 3—3 of FIG. 2.

While adapted for many different uses, the belt drive clutch 10 of the present invention is especially designed for use in "Ground Hog" one-or-two-man-operated earth auger diggers, each powered by a small 3 to 5 HP industrial gasoline engine 11 such as are currently being widely marketed under the manufacturers' firm names or trademarks: "Clinton," "Briggs & Stratton;" and "Wisconsin Robin."

The "Ground Hog" line of such diggers has been manufactured at San Bernardino, Calif., and distributed nationwide for the past thirty years by Ground Hog, Inc., a firm founded by the father and son team who are the applicants in this case.

One of the products which will particularly benefit by the advent of the present invention is the already patentably unique one man operated two wheeled-engine-chassis earth drill covered by U.S. Pat. No. 4,077,480, issued on Mar. 7, 1978 to the present applicants and assigned to Ground Hog, Inc.

Each of the engines 11 obtained from one of the sources noted above has a crankcase 12 enclosing a crankshaft S and a pair of main thrust bearings (not shown) in which said crankshaft journals thus confining it against endwise motion for rotation about a fixed axis of a hole H provided in a crankcase wall W through which hole said crankshaft S extends to integrally merge with an output power shaft 13 which is three-quarters of an inch in diameter and extends two and one-quarter inches from the annular shoulder, formed by said juncture with said crankshaft, to the tip of shaft 13, where said shaft is provided with a short, axial, tapped screw receiving bore for a purpose to be explained later.

The crankcase wall W is also provided with four tapped screw receiving holes D which are equally circumferentially spaced from each other and located at equal radii from the axis of shaft 13, for a purpose to be explained later.

The clutch 10 includes a centrally apertured cam mounting ring 14 which lies flat against the engine crankcase 12 concentric with shaft 13 and is secured in place thus by four screws 15 extending through suitable holes provided in said ring 14 and screwing into tapped holes D in said crankcase.

Occupying the flat peripheral area of the cam mounting ring 14 is a series of uniform cams 16 as well as a Bowden cable guide post 17 which is preferably located close to one of the screws 15 and in a counter clockwise direction therefrom near the upper extremity of the ring 14. The post 17 has a cable guide hole 18 near its tip for use in guiding a control cable 19 in a manner to be described later.

The ring 14 in the preferred embodiment is substantially four and one-quarter inches in diameter and, excepting for those areas occupied by cams 16 and guide post 17 is substantially one quarter of an inch thick.

Shaft 13 is provided with a keyway 20 and key 25 which extend from the crankshaft S to the tip of the shaft. Slidably received on shaft 13 so as to be splined thereto by key 25 is an outer sheave disc assembly 26 in which the following elements are permanently assembled: an externally hexagonally shaped sleeve 27 having a three-quarter inch bore with a keyway K which fits key 25 and thus locks sleeve 27 against rotation relative to shaft 13. The sleeve 27 is two and one-quarter inches in length so it just covers the entire shaft 13 when sleeve 27 is pressed against crankshaft S.

An outer tip portion 28 of sleeve 27 is turned down to eliminate the hexagonal shape of this portion and give it approximately a cylindrical shape. An outer sheave disc 29 has a hexagonal bore A which is slipped over the round tip portion 28 of sleeve 27 and given a pressed fit on the hexagonal portion of said sleeve. Said outer sheave disc 29 is held against outward removal by a snap ring 30 which snaps into an annular thin keyway 31 which has been provided at the inner end of said cylindrical tip portion 28 of sleeve 27 when modifying the latter.

The outer sheave disc assembly 26 also includes permanently assembled therewith a free-wheeling small self-lubricating ball bearing 32 having substantially coplanar central and peripheral races R-1 and R-2, the central race of which is given a pressed fit onto the hexagonal exterior of sleeve 27 immediately inside outer sheave disc 29 so as to extend with about two thousandths of an inch clearance into a flat inward recess B formed centrally in disc 29. A shim ring C is inserted between the central race R1 of ball bearing 32 and outer sheave disc 29 to assure axial clearance between the peripheral race R2 of said bearing and said disc.

An inner sheave disc assembly 33, the parts of which are also permanently assembled together and which unite with the outer split sheave disc assembly 26 and with cam ring 14 to form clutch 10 of the invention, is constructed as follows: An inner sheave disc 34 has a hollow stub shaft 35 integrally formed therewith which shaft extends inwardly from said disc and has a hexagonal bore 40 which slidably fits hexagonal sleeve 27.

Inner sheave disc 34 is centrally outwardly hollowed to form a concentric recess 41 in said disc which is adapted to receive small ball bearing 32 and thus give the necessary freedom of movement axially between outer assembly 26 and inner assembly 33 in the operation of the clutch 10.

The inner assembly 33 also includes a clutch control ring 42 having four cam follower arms 43 extending radially outwardly therefrom and circumferentially equally spaced apart, said ring having a sealed larger self-lubricated ball bearing 44 assembled therewith by a pressed axial fit of said ring externally upon the peripheral race of said bearing and having stub shaft 35 assembled upon the central race 45 of said bearing by an axial press fit of said stub shaft within said race.

Figure 4:
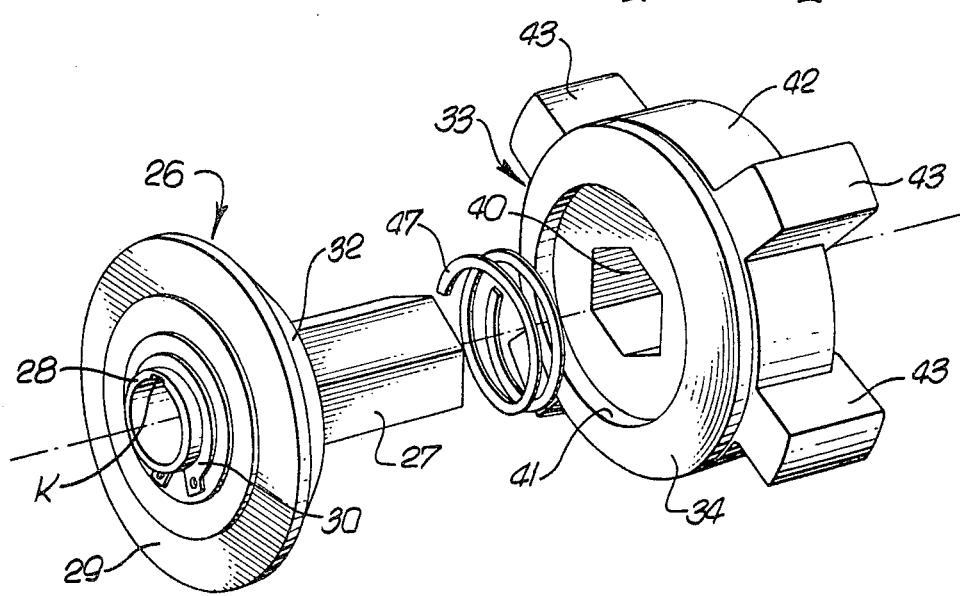
FIG. 4 is an exploded perspective view of two of the three major permanent assemblies of parts comprised in the invention.

Formed in one of the cam follower arms 43 (See FIG. 2) is a hole 46 for receiving a terminal portion of control cable 19. When assembling the two sheave disc assemblies 26 and 33 on hexagonal splined clutch mounting sleeve 27, as shown in FIG. 4, a coiled flat clutch spring 47 is slipped over said sleeve against the central race R1 of ball bearing 32, after which the inner end of sleeve 27 is slidably inserted in splined relation through the hex bore 40 of assembly 33 and the two assemblies, held together against the expansive bias of said spring, while the sleeve 27 is impaled upon the shaft 13 as shown in FIG. 3.

While the two assemblies are thus manually held in place, compressing spring 47 as above described, a washer 48 is placed against the tip of shaft 13 and secured in place by inserting a cap screw 49 axially therethrough and screwing the same into the heretofore mentioned tapped axial bore provided by the engine manufacturer in the tip of shaft 13. Its diameter being about seven-eighths of an inch, washer 48 tightly confines sleeve 27 against endwise movement on shaft 13, it being compressed thus endwise between crank shaft S and washer 48. Such assembly involves the sleeve being first rotated to effect a splined relation between shaft 13 and sleeve 27 in which shaft key 25 is caused to slidably fill the internal keyway K of sleeve 27 as shown in FIG. 3.

OPERATION

It needs to be kept in mind that outer and inner sheave discs 29 and 34 constantly rotate in splined relation with drive shaft 13 and sleeve 27 and thus with each other, at the same speed as the engine 11. The control of the clutch is accomplished entirely through pulling on the control cable 19 so as to tangentially rotate ring 42 bringing the four arms 43 concurrently into helical engagement with cams 16 producing a forward shifting of said ring which is transmitted through bearing 44 to the entire assembly 33 including inner disc 34. This reduces the axial spacing between the outer and inner split sheave discs 29 and 34, which brings these into gripping relation with an endless drive belt 50 which is shown in broken lines in FIG. 1 and which directly connects the engine with another pulley (not shown) but which constitutes the point for delivery of the power transmitted from engine 11 through the clutch 10.

A metal ferrule 51 is provided for guiding the control cable 19 where it passes through the cable guide post 17. Between the cable guide post 17 and the cam follower arm having hole 46, cable 19 passes through a coiled spring 52. After then passing through hole 46, the extremity of the cable 19 has an anchor sleeve 53 clamped on the cable end and solder sweated in place. The ferrule 51 captures one end of a flexible-cable-enveloping compression tube 54 thereby allowing precise control of clutch 10 through a substantial length of cable 19.

The free wheeling mounting of bearing 32 on hexagonal sleeve 27 (which is splined on engine output shaft 13) and therefore is always rotating at the same speed with the engine, has the advantage of allowing drive belt 50 and the peripheral race R2 of ball bearing 32 to idle together with respect to sleeve 27 while the clutch 10 is disconnected by relaxing the tension placed on cable 19 and entirely irrespective of the speed that the engine may be running. This allows the bearing 32 to remain at all times in non-frictional supporting relation with the endless drive belt excepting while the clutch is manually closed by the operator deliberately pulling on cable 19 for effecting this purpose. This purpose is strictly limited, in the present invention, to elect between two alternatives, the first of which is to de-clutch the engine, causing it to idle with almost an entire absence of friction on the drive belt 50. The second alternative is to effect a drive connection between the engine 11 and the other pulley (not shown) at the other end of belt 50 from clutch 10, by imparting travel to said belt through said clutch which will vary only as produced by throttle control of the engines shaft speed. In other words the present invention is essentially a clutch and not a split sheave speed varying power transmission.

We claim:

1. In a belt drive clutch adapted to be mounted in a spline driven relation on a power output shaft of a small internal combustion engine, the combination of:
    a sleeve slidably fitting over said power output shaft in a spline driven relation therewith, said sleeve having a hexagonal conformation externally;
    an inwardly bevelled outer sheave disc fixed on the outer extremity of said sleeve;
    means associated with said power output shaft to confine said sleeve in coextensively covering relation with said power output shaft;
    a drive belt supporting annulus provided to be freely rotatable on said sleeve and to occupy a position thereon just inwardly from said outer sheave disc;
    an oppositely bevelled inner sheave disc having a short hollow stub shaft extending inwardly from said inner sheave disc and integral therewith and having a hexagonal bore slidably fitting and spline matching the hexagonal external conformation on said sleeve;
    a ball bearing means having substantially co-planar central and peripheral races and permanently assembled on said stub shaft by pressing the central race of said bearing means thereon;
    a clutch control ring permanently assembled on said ball bearing means by pressing said control ring on said peripheral race of said ball bearing means; and
    means for shifting said control ring axially, while an endless drive belt is trained about said annulus, to engage or disengage said belt by optionally constricting or expanding the space between said outer and inner sheave discs.

2. A combination as recited in claim 1 wherein said control ring shifting means includes:
    a cam ring having means for fixing it on said engine in a plane normal to said power output shaft and concentric with the latter;
    a circumferentially equally spaced set of axially facing cams provided on said cam ring;

a matching set of cam follower arms radiating from said clutch control ring into simultaneous responsive relation with said cams when said control ring is rotated on its mounting ball bearing;

means for manually optionally rotating said control ring in a given direction causing said sheave discs to converge and thus engage said clutch; and spring means functioning automatically, when the aforesaid manual control means are allowed to relax, to spread said discs and thereby disengage a belt trained about said annulus.

3. A combination as recited in claim 2 wherein said control means for manually rotating said control ring to engage said clutch includes:

a Bowden control cable;

an apertured cable guide post extending axially from said cam ring in clockwise relation with the next adjacent cam engaging arm, the latter being apertured for receiving a terminal portion of said cable through both of said apertures;

coiled wire spring means surrounding said cable portion so as to be compressed between said post and said apertured arm; and anchor clip means clamped onto the extending end of said cable, said means preventing withdrawal of said cable through said apertured control ring arm and permitting said clutch to be engaged any time by pulling on said cable, and causing said clutch to be spring disengaged whenever said cable is released.

4. An endless-belt-driving-clutch accessory for a light powered gasoline engine having a crankshaft journalled in spaced main bearings mounted in a crankcase having a wall apertured concentrically with said crankshaft to allow a power output shaft, formed integrally with said crankshaft to form an annular shoulder at their juncture and to extend through said wall aperture over two and a quarter inches and receive an axial tapped screw hole in its end, said wall also having a series of equally radially spaced parallel tapped screw holes, said engine accessory comprising a combination of elements as follows:

a sleeve adapted to slidably fit and be coextensive in length with said power output shaft and be keyed thereto, said sleeve having external hexagonal spline means;

an inwardly bevelled shallow flanged outer sheave disc fixed on the outer extremity of said sleeve;

screw and washer means applicable to the tip of said shaft to confine said sleeve on said shaft in keyed relation therewith;

an oppositely bevelled inner sheave disc having a short hollow stub shaft extending inwardly from said inner sheave disc and integral therewith and having spline means in its bore matching that of said sleeve and freely slidable axially thereon;

a ball bearing means having substantially co-planar central and peripheral races and permanently assembled on said stub shaft by pressing the central race of said ball bearing means thereon;

a clutch control ring permanently assembled on said ball bearing means by pressing said control ring on said peripheral race of said ball bearing means;

a smaller ball bearing means having substantially co-planar central and peripheral races, said smaller central race being fixed on said sleeve just within said outer disc, said smaller peripheral race forming a freely rotatable annulus for supporting a drive belt between said discs when the latter are in retracted relation;

a spring means coiled about said sleeve between said smaller central race and said inner sheave disc; and remote control means adapted to be mounted on said engine wall for shifting said control ring axially, while an endless drive belt is trained about said annulus, to engage or disengage said belt by optionally constricting or expanding the space between said outer and inner sheave discs.

5. An endless belt driving clutch accessory as recited in claim 4 wherein said remote control means includes:

a cam ring adapted to fit close between said engine wall and said control ring and be secured to said wall by screws inserted in said radially spaced tapped engine wall holes;

a series of axially facing cams formed on said cam ring; and a matching set of cam follower arms radiating from said clutch control ring into simultaneous responsive relation with said cams when said control ring is rotated on its mounting ball bearing means thus causing said sheave discs to converge and engage said clutch.

6. A combination as recited in claim 5 wherein an axially extending cable post is provided on said cam ring on which a Bowden cable is supported for effecting remote manual rotation of said control ring; and coiled spring means on said cable for assisting disengagement of said clutch upon said cable being released.

* * * * *